(12) United States Patent
Layman et al.

(10) Patent No.: US 9,426,302 B2
(45) Date of Patent: Aug. 23, 2016

(54) SYSTEM AND METHOD FOR NON-DISRUPTIVE MITIGATION OF VOIP FRAUD

(71) Applicant: VONAGE BUSINESS INC., Atlanta, GA (US)

(72) Inventors: Randy Layman, Marietta, GA (US); Jonathan Alexander, Roswell, GA (US)

(73) Assignee: VONAGE BUSINESS INC., Atlanta, GA (US)

( * ) Notice: Subject to any disclaimer, the term of this patent is extended or adjusted under 35 U.S.C. 154(b) by 0 days.

(21) Appl. No.: 14/169,385

(22) Filed: Jan. 31, 2014

(65) Prior Publication Data
US 2014/0376705 A1 Dec. 25, 2014

Related U.S. Application Data

(60) Provisional application No. 61/837,606, filed on Jun. 20, 2013.

(51) Int. Cl.
| | |
|---|---|
| H04M 15/00 | (2006.01) |
| H04M 7/00 | (2006.01) |
| H04M 3/42 | (2006.01) |
| H04M 3/38 | (2006.01) |

(52) U.S. Cl.
CPC ............. *H04M 7/0078* (2013.01); *H04M 3/38* (2013.01); *H04M 3/42314* (2013.01)

(58) Field of Classification Search
CPC ....... H04W 11/12; G06F 21/45; H04L 63/14; H04L 63/1425; H04L 67/22
USPC ............. 379/114.04, 114.14, 121.01, 121.03, 379/127.02, 144.03, 91.01, 91.02; 455/410, 455/411; 705/14.26, 14.47; 713/168, 182, 713/183, 184, 185; 726/2, 3, 4, 5, 7
See application file for complete search history.

(56) References Cited

U.S. PATENT DOCUMENTS

| | | | |
|---|---|---|---|
| 5,345,595 A | 9/1994 | Johnson et al. | |
| 5,495,521 A * | 2/1996 | Rangachar | ............. H04M 3/36 379/145 |
| 5,729,597 A | 3/1998 | Bhusri | |
| 5,950,121 A * | 9/1999 | Kaminsky et al. | ............ 455/410 |

(Continued)

OTHER PUBLICATIONS

Peder Jungck, VoIP Fraud: Scenarios and Solutions, Internet Telephony Magazine, Mar. 2006, pp. 115-117, vol. 9-No. 3, A Technology Marketing Publication, Norwalk, CT, U.S.A.

*Primary Examiner* — Binh Tieu
(74) *Attorney, Agent, or Firm* — Alexander Legal LLC; Joseph Pagnotta (57) ABSTRACT

A system and method are disclosed herein for providing mitigation of VoIP PBX fraud while having minimal impact on authorized VoIP PBX users. The method includes a system for detecting potential fraud based on multiple and configurable fraud indicators as well as historical data, which can be customized for individual users or groups, which in turn can trigger the other parts of the system to mitigate fraud. The system can terminate in-process calls that are potentially fraudulent and reset the network access credentials for the user accounts or device(s) that have been potentially compromised. The system can use historical data to block further calls from the compromised user accounts or devices to specific locations where the presumed fraudulent calls were directed. In a further aspect, the system and method can automatically reset the network access credentials for authorized users with minimal down time.

22 Claims, 4 Drawing Sheets

(56) References Cited

U.S. PATENT DOCUMENTS

| | | | |
|---|---|---|---|
| 6,163,604 A * | 12/2000 | Baulier | H04M 3/36 |
| | | | 379/145 |
| 7,142,651 B2 | 11/2006 | Ronen et al. | |
| 7,248,681 B2 | 7/2007 | Betts et al. | |
| 7,574,202 B1 * | 8/2009 | Tsao | H04L 63/0272 |
| | | | 370/310 |
| 7,653,188 B2 | 1/2010 | Kloberdans et al. | |
| 8,340,259 B2 * | 12/2012 | Mahone | G06F 21/55 |
| | | | 379/114.02 |
| 8,737,962 B2 | 5/2014 | Ballai et al. | |
| 2003/0063725 A1 * | 4/2003 | Marchand | H04M 15/00 |
| | | | 379/114.14 |
| 2004/0063424 A1 * | 4/2004 | Silberstein et al. | 455/410 |
| 2007/0005984 A1 * | 1/2007 | Florencio | H04L 63/14 |
| | | | 713/178 |
| 2009/0213844 A1 * | 8/2009 | Hughston | H04M 3/4872 |
| | | | 370/352 |
| 2009/0320108 A1 * | 12/2009 | Livingston | G06F 21/31 |
| | | | 726/6 |
| 2011/0110367 A1 * | 5/2011 | Rae | H04M 7/006 |
| | | | 370/352 |
| 2011/0138462 A1 | 6/2011 | Kim et al. | |
| 2011/0142217 A1 | 6/2011 | Goldfarb | |
| 2011/0149955 A1 | 6/2011 | Petillo et al. | |
| 2012/0213082 A1 | 8/2012 | Carney et al. | |
| 2014/0045456 A1 | 2/2014 | Ballai et al. | |
| 2014/0075524 A1 | 3/2014 | Ho et al. | |
| 2014/0123228 A1 * | 5/2014 | Brill | H04L 63/1416 |
| | | | 726/4 |
| 2014/0226803 A1 | 8/2014 | Ballai et al. | |

* cited by examiner

SYSTEM AND METHOD FOR NON-DISRUPTIVE MITIGATION OF VOIP FRAUD

FIELD OF THE INVENTION

The present invention relates generally to Voice-over-Internet-Protocol (VoIP) and Session Initiation Protocol (SIP) electronic communications and, more particularly, to methods and systems for providing VoIP Private Branch Exchange (PBX) fraud mitigation in a manner that is effective, yet minimally disruptive, to an authorized user.

BACKGROUND OF THE INVENTION

A PBX is a telephone exchange that makes connections among the internal telephones of an organization, such as a private business or telephone network. The PBX allows these internal telephones to connect to the public switched telephone network (PSTN) via trunk lines and/or the Internet. A hosted PBX system delivers PBX functionality as a service, available over the PSTN and/or the Internet. A telephone company typically provides hosted PBXs using equipment located on the premises of the telephone company's exchange. A hosted PBX system means the customer organization does not need to buy or install PBX equipment and the telephone company can use the same switching equipment to service multiple PBX hosting accounts. Furthermore, VoIP gateways can be combined with traditional PBX functionality enabling businesses and organizations to use their managed Internet/Intranet to help reduce long distance expenses and to enjoy the benefits of a single network for voice and data, which gives greater cost savings, mobility and increased redundancy.

Like other internet-based computer systems, VoIP Private Branch Exchanges (PBX) have become a target for internet-based fraud. A hacker, one who compromises a VoIP PBX often by obtaining the SIP credentials of a VoIP telephony device of an authorized user, can place fraudulent phone calls through the VoIP PBX to any destination. Such fraudulent phone calls can sometimes incur large phone bills when placed to international locations. Such VoIP fraud results in financial liabilities owed by an authorized user or the VoIP PBX service provider to the call carriers who terminate these calls. A successful hacker can use SIP credentials to place numerous calls in a matter of minutes that can run up thousands of dollars in fraudulent VoIP calls through a VoIP PBX.

Multiple solutions have been devised to detect potential VoIP fraud through a VoIP PBX. Heretofore, however, in order to stop the VoIP fraud, prior-art automated systems have relied on methods which either at least temporarily impact the calling ability of the authorized users whose accounts were hacked and/or which do not effectively stop the hacker from placing further fraudulent calls and creating additional negative financial impact. Unlike some other internet-based computing services, any interruption of calling service for a VoIP PBX user can represent an intolerable business disruption with serious financial consequences, as many businesses and users rely on VoIP PBX for all their telephone communications, and telephone service is mission critical for many businesses. Therefore, the need exists for a system and method which effectively mitigates financial liability of VoIP fraud while being minimally disruptive to the communications of authorized users.

The present invention meets one or more of the above-referenced needs as described herein in greater detail.

SUMMARY OF THE INVENTION

The present invention relates generally to VoIP and SIP electronic communications and, more particularly, to methods and systems for providing non-disruptive mitigation of VoIP PBX fraud. Briefly described, aspects of the present embodiments include the following.

In a first aspect, the present embodiment provides a method for fraud mitigation executable on a computing device. The method accesses configurable data to define a plurality of fraud indicators. The method then dynamically monitors a user device or account to identify fraudulent calling activity based on the one or more of the plurality of defined fraud indicators. Upon a determination that fraudulent calling activity is occurring or has recently occurred on an affected user device or account, a fraud mitigation action is applied. Fraud mitigation actions may be chosen from at least one of call termination, call blocking or reissuing network access credentials for the affected user device or account.

In a further aspect, a fraud mitigation system executable on a computing device is disclosed. The fraud mitigation system accesses a connected storage system comprising configurable data for defining a plurality of fraud indicators. The computing device executes a fraud monitoring system for dynamically monitoring a user account or device to identify fraudulent calling activity based on the defined fraud indicators. Upon a determination that fraudulent calling activity is occurring or has recently occurred on a user device or account, at least one fraud mitigation component is employed. The fraud mitigation components include a call termination system, a phone credential change system, and a location blocking system. The call termination system terminates an identified fraudulent call occurring on the affected user device or account. The phone credential change system reissues new network access credentials to the affected user device or account. The location blocking system blocks future calls from the affected user device or account to a location identified in the fraudulent calling activity.

In a further aspect, the present embodiment provides a system and method for VoIP fraud mitigation for a VoIP PBX system wherein the fraud detection system relies on configuration data from a connected storage system which defines fraud indicators that can be set based on accumulated number of calls, the type of calls, and/or the cost of the calls. The types of calls may include long-distance calls, international calls, and/or other toll calls. The fraud indicators can be defined and set based on specific time periods, number of calls placed during a specific time period, and number of calls placed from a specific user or group of users.

In a further aspect, the present embodiment provides a system and method for VoIP fraud mitigation for a hosted VoIP PBX system wherein the Call Termination System can force the termination of live calls in a variety of ways including through an API made available by the VoIP PBX with call control capabilities and through interaction and manipulation of an Edge Server or a network device through which SIP and VoIP communications pass to or from the VoIP PBX.

In a further aspect, the present embodiment provides a system and method for VoIP fraud mitigation for a hosted VoIP PBX system wherein the credential reset system immediately issues new credentials to the VoIP PBX for the identified potentially compromised devices and accounts and delivers those credentials to the authorized devices through a secure channel, as well as potentially issuing other configuration changes to the targeted device in order to protect from further fraudulent activity. The credential reset system issues new credentials that may comprise a new SIP username and password. The credential reset system can also issue new configuration instructions that can comprise an alternative connection point such as a new IP address or DNS location. The credentials are delivered and enabled on the compromised devices with minimal disruption to authorized users. For some devices, depending on the device capabilities, this can be accomplished by the credential reset system sending a signal through a secure channel or changing a configuration setting that is automatically detected by the device. Once the device detects the signal from the credential reset system, the device will immediately update the new credentials and associated changes. For other devices, with more limited capabilities, a signal can be sent or a configuration setting changed that will cause the device to reboot, after which, the changes will take effect. In other cases, the user can be required to reboot or restart the device herself.

In a further aspect, the present embodiment provides a system and method for VoIP fraud mitigation for a hosted VoIP PBX system wherein the call blocking system, having received a fraud alert from the fraud detection system, identifies the targeted calling locations originating from the identified devices and accounts where fraud is occurring or recently occurred, wherein the targeted calling locations can be granular, such as a specific phone number, or more general, such as a calling area code, country code or continent. The call blocking system, having received a fraud alert from the fraud detection system, can implement the call blocking in a variety of ways including communicating with the VoIP PBX through an API to register the call blocking rules for the device or a group of devices for the blocked calling locations.

The above features as well as additional features and aspects of the present invention are disclosed herein and will become apparent from the following description of preferred embodiments of the present invention.

This summary is provided to introduce a selection of aspects and concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Before the present methods and systems are disclosed and described in greater detail hereinafter, it is to be understood that the methods and systems are not limited to specific methods, specific components, or particular implementations. It is also to be understood that the terminology used herein is for the purpose of describing particular aspects and embodiments only and is not intended to be limiting.

As used in the specification and the appended claims, the singular forms "a," "an," and "the" include plural referents unless the context clearly dictates otherwise. Similarly, "optional" or "optionally" means that the subsequently described event or circumstance may or may not occur, and the description includes instances where the event or circumstance occurs and instances where it does not.

Throughout the description and claims of this specification, the word "comprise" and variations of the word, such as "comprising" and "comprises," mean "including but not limited to," and is not intended to exclude, for example, other components, integers or steps. "Exemplary" means "an example of" and is not intended to convey an indication of preferred or ideal embodiment. "Such as" is not used in a restrictive sense, but for explanatory purposes.

Disclosed herein are components that can be used to perform the disclosed methods and systems. It is understood that when combinations, subsets, interactions, groups, etc. of these components are disclosed that although specific reference to each various individual and collective combinations and permutations cannot be explicitly disclosed, each is specifically contemplated and incorporated herein, for all methods and systems. This applies to all aspects of this specification including, but not limited to, steps in disclosed methods. Thus, if there are a variety of additional steps that can be performed it is understood that each of the additional steps can be performed with any specific embodiment or combination of embodiments of the disclosed methods.

As will be appreciated by one skilled in the art, the methods and systems may take the form of an entirely new hardware embodiment, an entirely new software embodiment, or an embodiment combining new software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, non-volatile flash memory, CD-ROMs, optical storage devices, and/or magnetic storage devices. An exemplary computer system is detailed in the discussion of FIG. 4 below.

Embodiments of the methods and systems are described below with reference to block and flowchart diagrams of methods, systems, apparatuses and computer program products. It will be understood that each block of the block diagrams and flowchart diagrams, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks contained in the block diagrams and flowchart diagrams support combinations of means for performing the specified functions, combinations of steps for performing the specified functions and program instruction means for performing the specified functions. It will also be understood that each block of the block diagrams and flowchart diagrams, and combinations of blocks in the block diagrams and flowchart diagrams, can be implemented by special purpose hardware-based computer systems that perform the specified functions or steps, or combinations of special purpose hardware and computer instructions.

Figure 1:
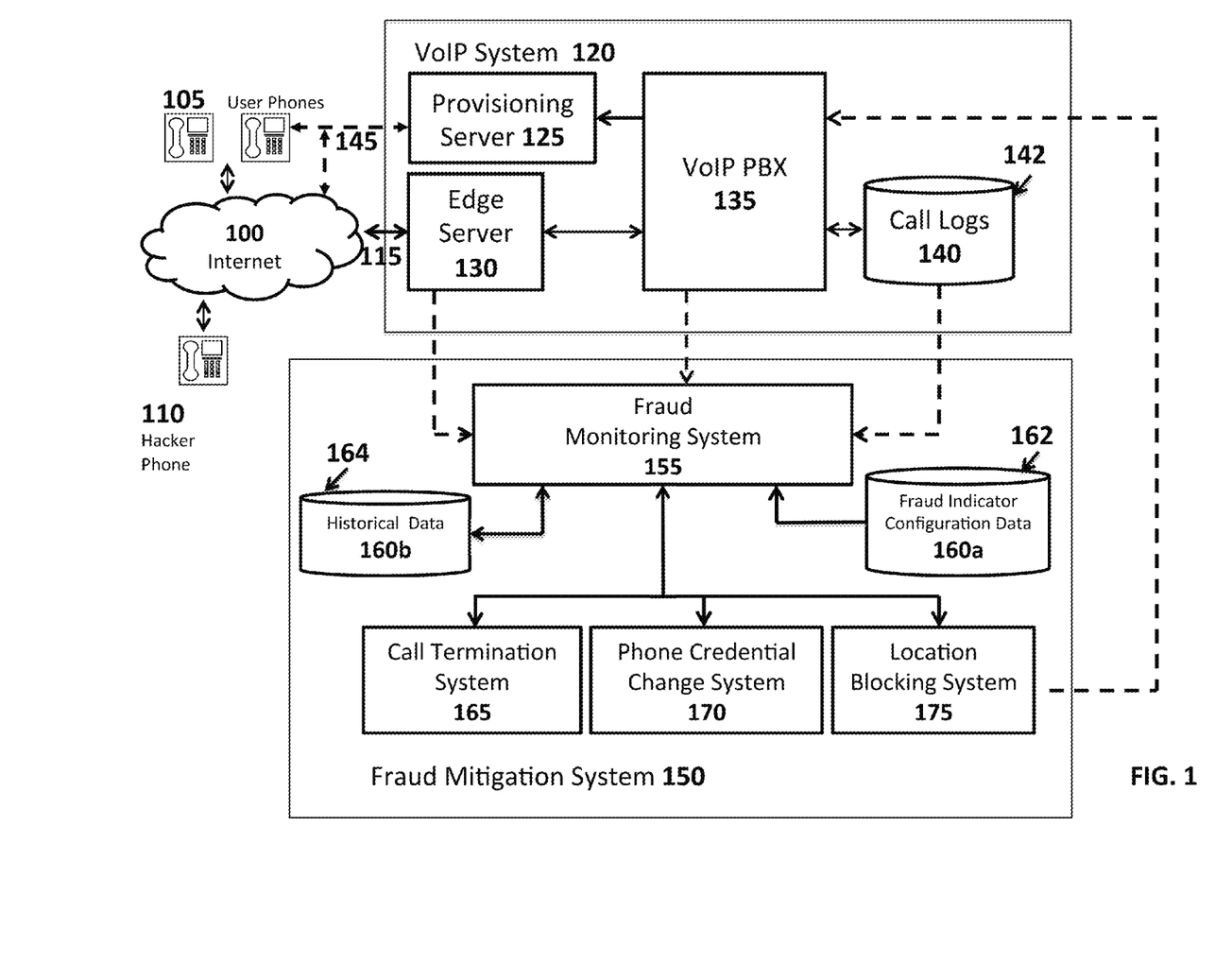
FIG. 1 is a block diagram of an exemplary embodiment of a hosted VoIP PBX Fraud Mitigation System in accordance with the subject invention.

FIG. 1 is a block diagram that details the various aspects of an exemplary embodiment in which the methods and systems of the subject invention can operate. The present disclosure relates to methods and systems for providing a hosted VoIP PBX Fraud Mitigation System that monitors a VoIP PBX, the SIP Devices (which are client devices, such as Internet-based telephone terminals) that register directly and interact with the VoIP PBX, and the network connections between the VoIP PBX and a plurality of SIP Devices. Further, the Fraud Mitigation System 150 is either non-disruptive or minimally disruptive to users and account holders of a VoIP PBX connected to same when employing fraud mitigation operations. Those skilled in the art will appreciate that present methods may be used in systems that employ both digital and analog equipment. One skilled in the art will also appreciate that provided herein is a functional description and that the respective functions can be performed by software, hardware, or a combination of software and hardware.

Turning now to FIG. 1, a block diagram illustrating a system 150 for providing fraud mitigation for a VoIP System 120 is provided. The Fraud Mitigation System 150 works with a VoIP System 120 used by one or more organizations for intra-company telecommunications and for telecommunications to and from outside parties via the Internet 100 or the PSTN (not shown). The Fraud Mitigation System 150 has four-parts: a Fraud Monitoring System 155, a Call Termination System 165, a Phone Credential Change System 170 and a Location Blocking System 175. The Fraud Monitoring System 155 detects potential fraud based on multiple and Configurable Data 160a which can be customized for individual users or groups and which in turn can trigger the other parts of the system to mitigate fraud. The Call Termination System 165 terminates in-process calls that are identified as potentially fraudulent. The Phone Credential Change System 170 resets the security authorization credentials for the authorized user (subscriber) accounts and/or SIP device(s) (hereinafter "user accounts and/or devices" 105) which credentials have been potentially compromised by the fraud perpetrator. The Location Blocking System 175 blocks future calls from fraud perpetrators, such as Hackers 110, based on previously identified fraudulent calling data.

The embodiments described herein provide protection against fraud damage and are unique beyond prior methods in that, beyond other aspects, in-process calls that are potentially fraudulent are terminated immediately combined with device credential reset and call location blocking to stop further fraudulent calls. This Fraud Mitigation System 150 and an attendant method (described in greater detail below) allows for minimal disruption of the calls of authorized users and is unique beyond prior methods in that it combines configurable thresholds for detection of fraud with targeted mitigation techniques, including the automated reset of credentials for authorized user accounts and/or devices 105 and the automated blocking of calls from non-authorized devices 110 and to specific non-authorized locations.

The Fraud Monitoring System 155 relies on Configuration Data 160a stored in a First Connected Storage System 162, wherein the Configuration Data 160a is used to define fraud threshold triggers or fraud indicators. The Fraud Mitigation System 150 uses this Configuration Data 160a to dynamically monitor calls that are being placed within the network in real time, by one or a group of user accounts and/or devices 105 for activities that are indicative of fraud.

Fraud indicators selected for the Configuration Data 160a can be based on any number of factors. Some of these factors include, but are not limited to, destination of the outgoing calls, calling patterns, time of day calls are placed, and the like. Fraud indicators related to real-time calling pattern data are used to analyze one or more characteristics of the calls being placed by one or a group of user accounts and/or devices 105. Real-time calling pattern data can also include the accumulated number of calls placed, the accumulated number of calls placed within a specific time period, the types of calls placed (such as international or toll-free calls), or the estimated or exact cost of calls being placed and other real-time calling pattern data. Fraud indicators can rely on thresholds that are defined for specific time periods, such as the number of calls made by one or a group of user accounts and/or devices 105 in a minute or in an hour of a given day; or the accumulated cost of calls within a specific time period, such as per minute, per hour, per day; etc. Each of these characteristics may be used individually or cumulatively in the real-time analysis of outgoing calls. The Configuration Data 160a can be provided individually for each user account and/or device 105 or universally across a service provider's network.

The Fraud Monitoring System 155 can be further configured to intervene based upon Historical Data 160b from a Second Connected Storage System 164. In an exemplary embodiment, once the Fraud Mitigation System 150 determines that a particular call is fraudulent, meta-data and other characteristics of the call the can be analyzed and stored in the Historical Data 160b. As calls are being placed in real-time, the Fraud Monitoring System 155 can first query the Historical Data 160b to determine if the call matches any previously determined fraudulent patterns. For example, the system 155 can be further configured to record certain phone numbers or calling destinations that were previously determined to be fraudulent. Future calls to these phone numbers or calling destinations can be blocked. The system 155 can also block certain types of calls during certain hours of the day if there is a history of fraudulent calling being placed during certain hours of the day. For example, if historically, most fraudulent calling activity occurs between 1:00 am and 6:00 am on a given day of the week, the Fraud Monitoring System 155, can be configured to block all toll calls for a given phone number or subscriber during those hours.

The Fraud Monitoring System 155 can be configured to record or memorialize any previous calling activity that was determined to be fraudulent in the Historical Data 160b. For example, in an exemplary embodiment, the Historical Data 160b can include location-based calling pattern data including calls to specific phone numbers, area codes, states, or countries around the world. In the exemplary embodiment, if a country has a known history or pattern of originating or receiving fraudulent calling activity, this information can be stored in the Historical Data 160b so that calls to that country may be placed under stricter scrutiny. Therefore, any number of factors can be recorded in the Historical Data 160b and any number of these recorded factors can be used by the Fraud Monitoring System 155 to analyze calling patterns initiated by one or a group of user accounts and/or devices 105 to interrupt fraudulent calling activities.

The Fraud Monitoring System 155 can dynamically adjust fraud indicators based on user settings and/or Historical Data 160b. For example, a calling threshold can be set stricter during particular periods of time, such as off-peak hours. This also allows the Fraud Monitoring System 155 to dynamically adjust fraud indicators based on Historical Data 160b, including previously observed patterns, statistical data or machine learning (artificial intelligence) techniques. Furthermore, different fraud indicators can be defined for different users or groups. The different fraud indicators can be based on the previous Historical Data 160b of the group or the previous Historical Data 160b of the service provider.

The Fraud Monitoring System 155 can combine one or more fraud indicators available in the Fraud Indicator Configuration Data 160a and the Historical Data 160b in its analysis of outgoing calls. For example, the Fraud Monitoring System 155 may consider multiple calls within a short time period to certain high-fraud risk countries, after business hours, to be indicative of fraudulent calling activity. Any number of factors could be combined in any number of ways to trigger the Fraud Monitoring System 155 to detect potential fraud associated with a user account and/or device 105. The Fraud Monitoring System 155 can also be configured such that if multiple thresholds are exceeded for one or more fraud indicators, then the outgoing call is interrupted.

The Fraud Monitoring System 155 dynamically monitors the call activity of one or a group of user accounts and/or devices 105 on a VoIP PBX network 135 and then compares the activity to the configured fraud indicators. The Fraud Monitoring System 155 can monitor activity on a VoIP PBX 135 in a variety of ways, including but not limited to: monitoring network traffic through an Edge Server 130 through which user accounts and/or devices 105 and VoIP communications pass to or from the VoIP PBX 135; monitoring activity through direct communications with the VoIP PBX 135 such as through an API of the VoIP PBX 135; reading Call Logs 140 produced by the VoIP PBX 135 for completed calls such as those stored in a database or similar storage device 142 with an interface allowing such Call Logs 140 to be accessed and read. When one or a group of user accounts and/or devices 105 on a VoIP PBX network 135 activity meets or exceeds the fraud thresholds or fraud indicators defined for the network or subscriber, then the Fraud Monitoring System 155 triggers a fraud alert to the other system components 165, 170, and 175 such that mitigation actions are taken. The fraud alert identifies to the other system components 165, 170 and 175 an individual user, a group of users and/or one or more SIP devices 105 on the VoIP PBX network 135 for which the presumed fraud was detected, as well as the calling locations where the presumed fraudulent calls were placed. This activity may be recorded as Historical Data 160b to prevent similar fraudulent activity from occurring in future calls. Historical Data 160b can store fraudulent calling patterns, such as a high volume of fraudulent calls to a specific location within a specific time period. This can trigger the Fraud Monitoring System 155 to take immediate action for the affected user account and/or device 105. Similarly, repeated occurrences, recorded in the Historical Data 160b, across multiple user accounts and/or devices 105 can result in the Fraud Monitoring System 155 recognizing a repeated problem to that location, which in turn, can result in using the Location Blocking System 175 to block all calls to that location across all user accounts and/or devices 105. In an alternative embodiment, the Location Blocking System 175 can also limit its location blocking via more fine-grained methods, such as blocking all calls during specific time periods, for example on weekends and/or between the hours of 1am and 6 am; blocking all calls to a specific location during defined time periods (e.g. after normal work hours, nights, weekends); and/or blocking certain types of calls, such as long distance calls, during specific time periods that have historically had a strong propensity to indicate fraudulent activity.

In a further embodiment, the Fraud Mitigation System 150 includes a Call Termination System 165. Having received a fraud alert message from the Fraud Monitoring System 155, the Call Termination System 165 relies on information in the fraud alert message to identify the devices and calling locations where fraud is presumed to be occurring or has recently occurred. The Call Termination System 165 can immediately terminate all in-process calls originating from user accounts and/or devices 105 where the presumed fraud was detected and going to destinations where presumed fraudulent calls or potentially fraudulent calls are directed. In an alternative embodiment, the Call Termination System 165 can only terminate those calls that are presumed to be fraudulent, while allowing other calls originating from the affected user accounts and/or devices 105 to remain active. The Call Termination System 165 can base its call termination decisions according to Historical Data 160b from the Fraud Indicator Configuration Data 160a and analysis by the Fraud Monitoring System 155. Therefore, if an affected user account and/or device 105 has an authorized, active, outgoing call that is in process, and a Hacker 110 is able to infiltrate the same user account and/or device 105 to engage in fraudulent activity during the same time, the Fraud Monitoring System 155 is capable of distinguishing the authorized calling activity over the potentially fraudulent calling activity that is originating from the user account and/or device 105. The Fraud Monitoring System 155 can engage the Call Termination System 165 to terminate the fraudulent activity originating from the affected user account and/or device 105 while allowing the authorized call originating from the user account and/or device 105 to continue to remain active. The Fraud Monitoring System 155 can analyze activity originating from a user account and/or device 105 to determine whether it is authorized based upon previous calls to a regularly dialed phone number found in the Historical Data 160b and/or machine learning techniques, which can judge a call to be an authorized outgoing communication. Therefore, the authorized call would remain active, while other calls, deemed to be fraudulent, would be terminated.

The Call Termination System 165 can force the end of calls in a variety of ways. For example, the Call Termination System 165 can force the end of calls through an API made available by the VoIP PBX 135 with call control capabilities. The Call Termination System 165 can also force the end of calls through interaction and manipulation of an Edge Server 130. If necessary the Call Termination System 165 can terminate the call at the affected user account and/or device 105, by sending an API for a call termination or "hang-up" request to the affected user account and/or device 105.

In a further embodiment, there is a Phone Credential Change System 170. The Fraud Monitoring System 155 identifies the user accounts and/or devices 105 from which a presumed Hacker 110 has obtained credentials to either place fraudulent calls through the user accounts and/or devices 105 or through separate devices 110 using those credentials, which trigger a fraud alert message in the Fraud Mitigation System 150. Once the Phone Credential Change System 170 receives a fraud alert message from the Fraud Monitoring System 155, the Phone Credential Change System 170 immediately instructs a Provisioning Server 125 to issue new credentials to the VoIP PBX 135 for the compromised user accounts and/or devices 105. The Provisioning Server 125 delivers these new credentials to the authorized user accounts and/or devices 105 through a secure channel 145. The Provisioning Server 125 can also issue other configuration changes to the targeted user account and/or device 105 in order to protect against further fraud. In an embodiment, the user account and/or device 105 receives a special API call or other signal from the Provisioning Server 125 with the new credentials over the secure channel 145. In an exemplary embodiment, the user account and/or device 105 is capable of "hot-swapping" the old login credentials for the new login credentials. This means the authorized user of the user account and/or device 105 can continue to use their devices with potentially no down time. However, in an alternative embodiment, some user accounts and/or devices 105 may require a reboot. In these instances, for the affected user accounts and/or devices 105, the user can continue to communicate on an existing call; however, once the existing call is completed, the user will be required to reboot or reinitiate the user account and/or device 105 before another call can be placed from the device. In other embodiments, a signal sent from the Provisioning Server 125 can automatically reboot or reinitiate a user account and/or device 105 either once the signal is received at the user account and/or device 105 or once an authorized user of the account and/or device 105 completes an existing call. In still an alternative embodiment, for a user account and/or device 105 requiring a reboot, any active users of the user account and/or device 105 may receive a tone or message during the active call indicating that the call will be terminated in within a specific amount of time and at the expiration of that time, the Phone Credential Change System 170 would automatically reboot the device with the new network access credentials.

In a further embodiment, the Provisioning Server 125 issues login and other network access credentials to the user accounts and/or devices 105. In an embodiment, the Provisioning Server 125 can dynamically assign, revoke, and/or change access credentials of the user accounts and/or devices 105 connected to the VoIP PBX network 135. In one configuration, a user account and/or device 105 can contain instructions to periodically "ping" the Provisioning Server 125 to verify that the user account and/or device 105 credentials are still current and active. Once a user account and/or device 105 is deemed to have been compromised, then the Provisioning Server 125 can dynamically and automatically reassign network access credentials of the user account and/or device 105 without user or operator intervention. These new or reassigned network access credentials can result in the termination of all active calls for the user account and/or device 105. However, in an alternative embodiment, the Call Termination System 165 can instruct the Provisioning Server 125 to delay reassignment of the network access credentials until after an authorized call from the user account and/or device 105 is terminated. However, the Call Termination System 165 can still identify a potentially fraudulent call originating from the user account and/or device 105 and terminate it while it is in process without affecting the authorized call.

In a further embodiment, the Phone Credential Change System 170 communicates through the Provisioning Server 125 with the user accounts and/or devices 105 over a secure connection 145 that can be separate from the connection 115 between the user accounts and/or devices 105 and Edge Server 130. The Provisioning Server 125 manages the connections between the user accounts and/or devices 105 with the VoIP System 120 by assigning and revoking configuration credentials that the user accounts and/or devices 105 need in order to connect to the VoIP System 120. The Provisioning Server 125 can assign pertinent configuration information such as the user name, password, DNS location, IP addresses, etc., to the user accounts and/or devices 105. The new credentials can include a new username and password for the user accounts and/or devices 105. Furthermore, the Provisioning Server 125 can configure the user accounts and/or devices 105 with additional configuration settings including an alternative connection point such as a new IP address or DNS location. By issuing new credentials and other secure configuration instructions automatically, the Phone Credential Change System 170, in communication with the Provisioning Server 125, allows an authorized user accessing the authorized device to continue making phone calls, while a Hacker 110 who has obtained the prior credentials and used them to place fraudulent phone calls through the VoIP PBX 135 is denied further access. Preferably, the action to deny the Hacker 110 continued access occurs immediately upon detection of the fraudulent activity. The new credentials and related data can be securely delivered to the user accounts and/or devices 105 in a variety of ways, including but not limited to: staging them on a secure server to which only authorized user accounts and/or devices 105 can connect and which the devices poll frequently for updates; sending them directly over the network to the user accounts and/or devices 105 where the device IP addresses are known and accessible to the Phone Credential Change System 170 and where an interface for the delivery of such information exists on the device. The Provisioning Server 125 provides a file store for user accounts and/or devices 105 configuration files since there are different formats for different types of phones according to the device manufacturer requirements. Each account and/or device 105 has a DNS address for the Provisioning Server 125 and these user accounts and/or devices 105 pick-up files at a configured interval via a known network connection protocol such as FTP or HTTP. The Provisioning Server 125 may also contain code to periodically "ping" the user accounts and/or devices 105 via the secure connection 145 so that their login credentials can be automatically changed frequently and immediately. In an alternative embodiment, the Provisioning Server 125 can periodically send a signal to user accounts and/or devices 105 that can trigger a credential change that requires a reboot (typically after business hours). These frequent and periodic credential changes can make it very difficult to hack the VoIP System 120.

In still a further embodiment, there is a Location Blocking System 175. Having received a fraud alert message from the Fraud Monitoring System 155 which identifies the user accounts and/or devices 105 and calling locations where fraud is presumed to have recently occurred and where fraud may still be occurring, the Location Blocking System 175 can immediately take action to block further calls from the potentially compromised user accounts and/or devices 105 to the targeted locations. Locations might be granular, such as a specific phone number, or more general, such as a calling area code, country code, or even a continent. The Location Blocking System 175 could be used to block all calling to a location across all user accounts and/or devices 105. For example, if a number of user accounts and/or devices 105 are compromised and the Fraud Monitoring System 155 detects multiple user accounts and/or devices 105 all calling the same target location, then the action taken can be to completely block all calls to that location regardless of the user accounts and/or devices 105 being used. The Location Blocking System 175 can implement call blocking in a variety of ways, such as by communicating with the VoIP PBX 135 through an API to register the call blocking rules for the user accounts and/or devices 105 or a group of user accounts and/or devices 105 and for the blocked calling locations. The Location Blocking System 175 can store the blocked calling location and call blocking rules within the Historical Data 160b for future reference by Fraud Mitigation System 150.

Figure 2:
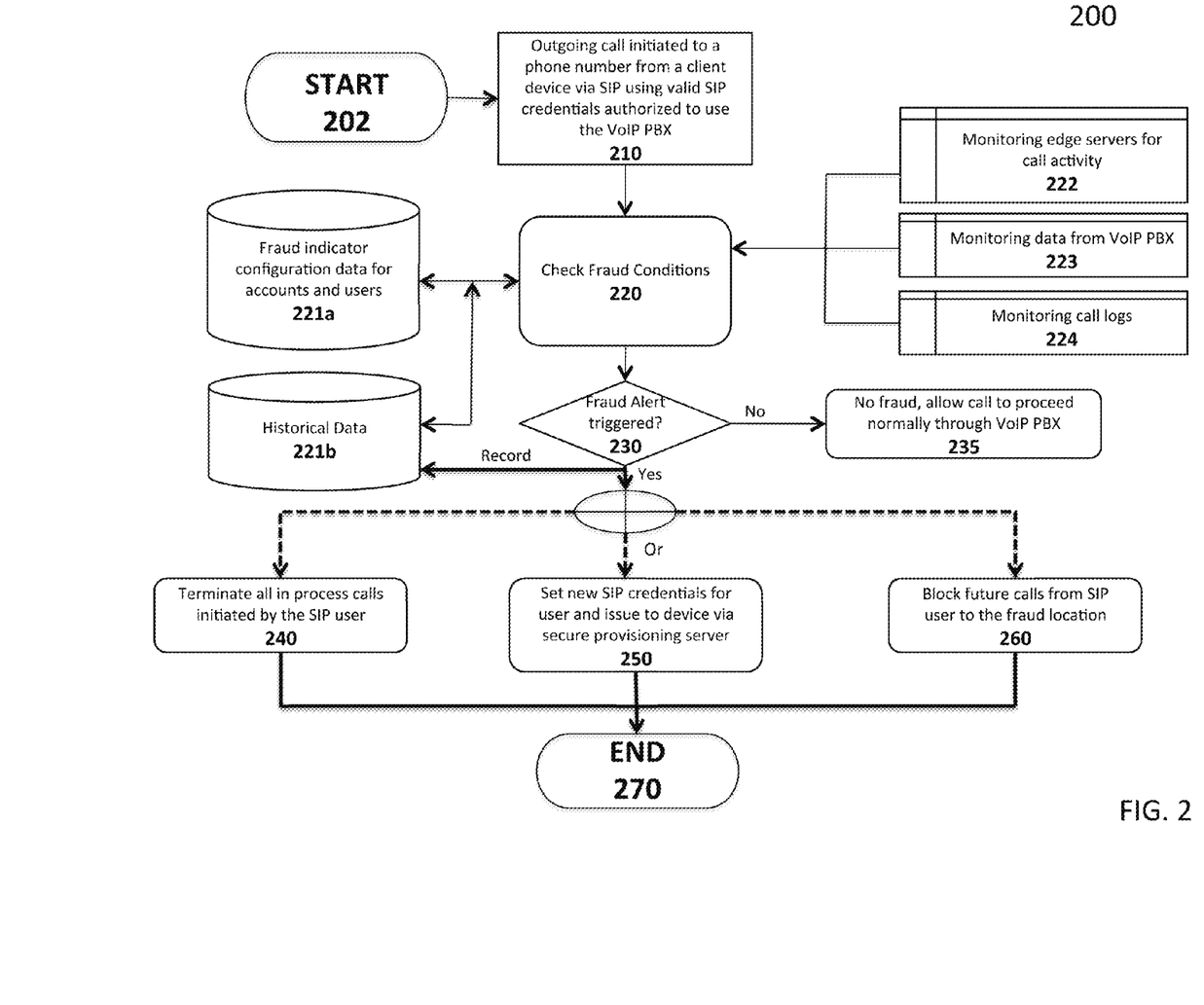
FIG. 2 is a flowchart of an exemplary embodiment of a method of hosted VoIP PBX fraud mitigation in accordance with the subject invention.

Turning now to FIG. 2, a flowchart diagram of a method 200 for implementing the VoIP fraud mitigation is provided. The method is described in association with the Fraud Mitigation System 150 described above. Beginning at step 202 and proceeding to step 210, an outgoing call is initiated to a phone number from a user account and/or device 105 via SIP using valid SIP credentials authorized for use on the VoIP PBX 135. The method then proceeds to step 220.

The Fraud Monitoring System 155 monitors the user accounts and/or devices 105 for activities that match previously fraudulent activity, exceed fraud threshold conditions, or match fraud indicators at step 220. More specifically, the Fraud Monitoring System 155 can monitor the Edge Server 130 for call activity at step 222. The Fraud Monitoring System 155 can also monitor the VoIP PBX 135 for calling data at step 223 which can indicate fraudulent activity. The Call Logs 140 and Historical Data 160b are further monitored at step 224 to determine patterns of calling activity which can indicate various types of fraud. The monitored data gathered in steps 222-224 is collected and compared at step 220 to Fraud Indicator Configurable Data and/or to Historical Data gathered in steps 221a, 221b respectively. The system is able to evaluate fraud conditions 220 by determining if the data collected in steps 222-224 match the Historical Data 160b and/or exceeds the conditions established in the Fraud Indicator Configurable Data 160a. These Fraud Indicator Configurable Data 160a can comprise call volume, call length, call type, and/or calling expenditures per user account and/or device 105, etc. Historical data 160b including typical calling patterns, location of originating call, calling locations, frequency of calls, frequency of calls at various times during the day, frequency of calls to various locations, frequency of call during various days of the week, average length of calls, frequency of calls to numbers or locations not within the user's contact database, and other fraudulent calling pattern data can also be monitored. This data can be configured for individual user accounts and/or devices 105, organizations, groups of accounts and/or devices 105, and/or network-wide for a given service provider. Therefore, different user accounts and/or devices 105 within the same group or organization may have different Fraud Indicator Configurable Data 160a or conditions. Thus, each user account and/or device 105 may have Fraud Indicator Configurable Data 160a that may be configured individually or as part of a group. Alternatively, the service provider may provide universal Fraud Indicator Configurable Data 160a and Historical Data 160b to prevent fraudulent activity. After this comparison of Fraud Indicator Configurable Data 160a versus Historical Data is made, the method proceeds to step 230.

At step 230 the Fraud Monitoring System 155 determines if the monitored data gathered in steps 222-224 has exceeded the Configurable Indicator Data 160a and/or matches some Historical Data 160b at step 232. If the thresholds have been exceeded, the system records this information in the Historical Data 160b. If the thresholds have been exceeded or if calling activity matches the Historical Data 160b; then the Fraud Mitigation System 150 activates at least one of steps 240, 250, or 260. If the thresholds have not been exceeded, the system proceeds to step 235, where the call is allowed to proceed normally since no fraudulent activity has been detected.

The Fraud Monitoring System 155 can send out a fraud alert to the Call Termination System 165, the Phone Credential Change System 170, or the Location Blocking System 175. The fraud alert contains information for identifying the user account and/or device 105 that is suspected of fraudulent activity. At step 240, the fraud alert is passed to the Call Termination System 165. The Call Termination System 165 acts immediately to terminate all in process calls initiated by the affected user accounts and/or devices 105. The Call Termination System 165 can issue instructions to the Edge Server 130, the VoIP PBX 135 or to the user accounts and/or devices 105 to terminate in process calls from the affected user accounts and/or devices 105.

At step 250, the fraud alert is passed to the Phone Credential Change System 170. The Phone Credential Change System 170 contacts the Provisioning Server 125 and orders it to reset the credentials of the affected user accounts and/or devices 105 that are registered with the VoIP PBX 135. The Phone Credential Change System 170 instructs the Provisioning Server 125 to immediately issue new credential requirements to the VoIP PBX 135 for the potentially compromised user accounts and/or devices 105. The credential changes are handled through a secure channel 145 or connection 115 between the user accounts and/or devices 105, the Provisioning Server 125, the VoIP PBX 135, and the Phone Credential Change System 170. Other configuration data associated with the affected user accounts and/or devices 105 can also be changed. The new credentials can include a new SIP username and password. The other configuration data can include other network identifiers such as a new IP address or DNS location, for example.

At step 260, the fraud alert is sent to the Location Blocking System 175. The Location Blocking System 175 receives the fraud alert and analyzes the calling data to determine the calling locations of the fraudulent activity. This calling location information can be granular, such as a specific phone number. This calling location information can also be more general, such as a calling area code, country code, or a continent. The Location Blocking System 175 immediately takes action to block further calls from user accounts and/or devices 105 connected to the VoIP PBX 135 system. The Location Blocking System 175 can record this information in Historical Data 160b such that the VoIP PBX 135 can block all future fraudulent activity associated with a particular calling location. The method 200 ends at step 270.

Note, in an alternate embodiment of the invention, the activities occurring in steps 240-260 may occur sequentially, simultaneously or in any combination thereof including not taking one or more such steps. This allows the components of the Fraud Mitigation System 150 to work together to immediately stop fraudulent activity while allowing authorized owners of the user accounts and/or devices 105 to continue to use their devices with minimal interruption.

Figure 3:
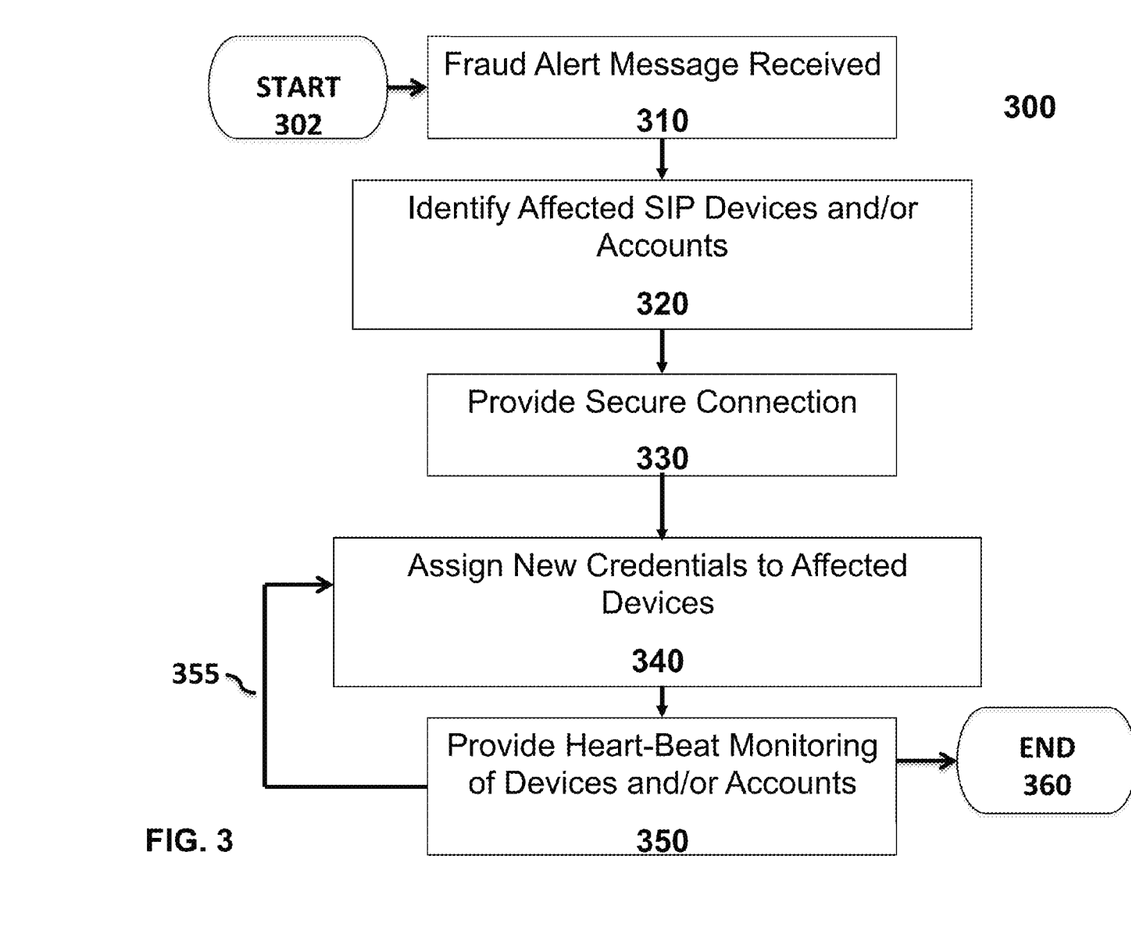
FIG. 3 is a flowchart of an exemplary embodiment of a method for performing credential reset in accordance with the subject invention.

Turning now to FIG. 3, a method 300 of acting upon phone credentials based upon a fraud mitigation alert is provided. The method is described in association with the Fraud Mitigation System 150 described above. Beginning at step 302 and proceeding to step 310 the Phone Credential Change System 170 receives a fraud alert message from the Fraud Monitoring System 155. The fraud alert message contains information for identifying the affected user accounts and/or devices 105. The Phone Credential Change System 170 then acts on this information to stop the fraudulent activity.

At step 320, the Phone Credential Change System 170 parses the fraud alert message to identify the affected user accounts and/or devices 105. The identified user accounts and/or devices 105 can include an individual device or a group of devices.

At step 330, the Phone Credential Change System 170 provides a secure connection with the affected user accounts and/or devices 105 so that their individual credentials can be reset. The Phone Credential Change System 170 also establishes a secure connection with the VoIP PBX 135 so that it can be updated with the new credentials of the affected user accounts and/or devices 105.

At step 340 the Phone Credential Change System 170 then resets the credentials and automatically assigns new user names and passwords for the affected user accounts and/or devices 105. In addition, the Phone Credential Change System 170 can also assign a new IP address and/or DNS locations for the affected user accounts and/or devices 105. The Phone Credential Change System 170 further updates the VoIP PBX 135 with this new credential information for the affected user accounts and/or devices 105 using the secure connection.

At step 350 the Phone Credential Change System 170 provides Heart-Beat Monitoring to the user accounts and/or devices 105 by periodically verifying that the user accounts and/or devices 105 are securely connected to the network and have not been tampered with. Therefore, the Phone Credential Change System 170 monitors the user accounts and/or devices 105 for other suspicious activity, including but not limited to, an IP address change or a DNS location change, for example. This monitoring can take place continuously by allowing the Provisioning Server 125 to periodically "ping" the user accounts and/or devices 105 to ensure they are securely connected to the network. In a further embodiment, the Provisioning Server 125 periodically updates the credentials of the user accounts and/or devices 105 by assigning new credentials to these devices. Furthermore, individual user accounts and/or devices or a group of user accounts and/or devices 105 that have been consistently targeted by Hackers 110, may receive special attention from the Provisioning Server 125, such that their credentials are more frequently updated either permanently or at least for some period of time via a feedback loop at step 355. The method 300 ends at step 360.

Figure 4:
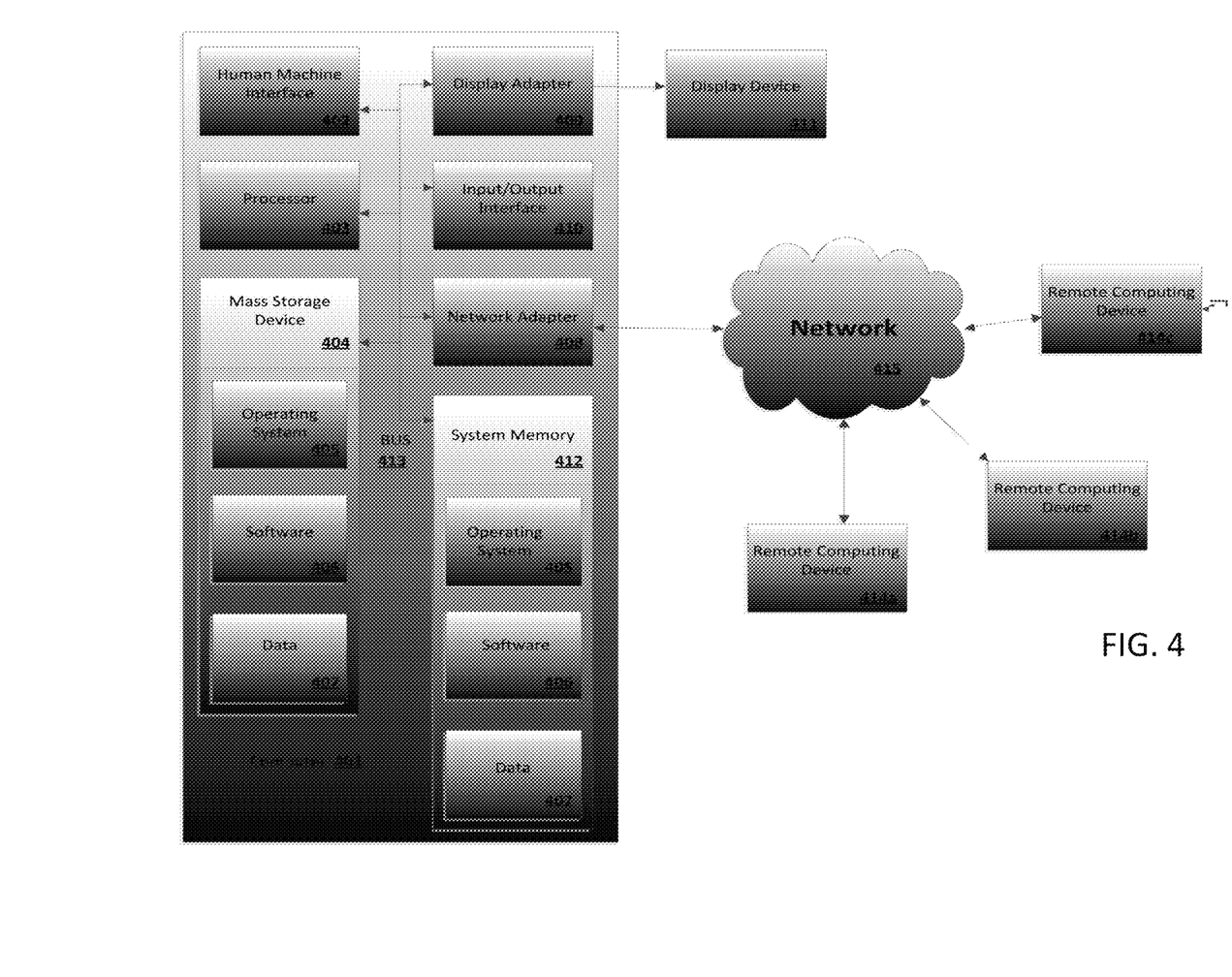
FIG. 4 is a block diagram of an exemplary computing environment that may be used in conjunction with example embodiments and aspects.

Turning now to FIG. 4, one skilled in the art will appreciate that the systems and methods disclosed herein can be implemented via a general-purpose computing device in the form a computer 401. The components of the computer 401 can comprise, but are not limited to, one or more processors or processing units 403, a system memory 412, and a system bus 413 that couples various system components including the processor 403 to the system memory 412. In the case of multiple processing units 403, the system can utilize parallel computing.

The system bus 413 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Private Branch Exchange (PBX) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 413, and all buses specified in this description can also be implemented over a wired or wireless network connection and each of the subsystems, including the processor 403, a mass storage device 404, an operating system 405, software 406, data 407, a network adapter 408, system memory 412, an input/output interface 410, a display adapter 409, a display device 411, a human machine interface 402, can be contained within one or more remote computing devices 414a,b,c at physically separate locations, connected through buses of this form, in effect implementing a fully distributed system.

The computer 401 typically comprises a variety of computer readable media. Exemplary readable media can be any available media that are accessible by the computer 401 and comprise, for example, both volatile and non-volatile media, as well as, removable and non-removable media. The system memory 412 comprises computer readable media in the form of volatile memory, such as random access memory (RAM), and/or non-volatile memory, such as read only memory (ROM). The system memory 412 may contain data such as media, video, audio, or other data 407 and/or program modules such as an operating system 405 and software 406 capable of manipulating, translating, transcoding, or otherwise editing the data 407 that are immediately accessible to and/or presently operated on the by the processing unit 403.

In another aspect, the computer 401 can also comprise other removable/non-removable, volatile/non-volatile computer storage media. By way of example, FIG. 4 illustrates a mass storage device 404, which can provide non-volatile storage of computer code, computer readable instructions, data structures, program modules and other data for the computer 401. For example, a mass storage device 404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 404, including by way of example, an operating system 405 and hosted VoIP PX software 406. Both the operating system 404 and hosted VoIP PX software 406 (or some combination thereof) can comprise elements of the programming and the hosted VoIP PX software 406. Media, video, audio, or other data 407 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems. Examples of hosted VoIP PX software include Asterisk®, FreeSwitch®, or Microsoft Lync® server software.

In another aspect, the user can enter commands and information into the computer 401 via client device or an input device (not shown). Example of such input devices comprise a keyboard, pointing device (e.g., a "mouse"), a microphone, a joystick, a scanner, tactile input devices such as gloves, and other body coverings, and the like. These and other input devices can be connected to the processing unit 403 via a human machine interface 402 that is coupled to the system bus 413, but also can be connected by other interface and bus structures, such as a parallel port, game port, IEEE 1394 Port (also known as a Firewire port), a serial port, or a universal serial bus (USB).

In yet another aspect, a display device 411 can also be connected to the system bus 413 via an interface, such as a display adapter 409. It is contemplated that the computer 401 can have more than one display adapter 409, and the computer 401 can have more than one display device 411. For example, a display device can be a monitor, an LCD (Liquid Crystal Display), or a projector. In addition to the display device 411, other output peripheral devices can comprise components such as speakers (not shown) and a printer (not shown), which can be connected to the computer 401 via input/output interface 410. Any step and/or result of the methods can be output in any form to an output device. Such output can be any form of visual representation, including but not limited to, textual, graphical, animation, audio, tactile, and the like. The display 411 and computer 401 can be part of one device, or separate devices.

The computer 401 can operate in a networked environment using logical connections to one or more remote computing devices 414a,b,c. By way of example, a remote computing device can be a personal computer, portable computer, smartphone, softphone, client device, a server, a router, a network computer, a peer device or other common network node, and so on. Logical connections between the computer 401 and remote computing device 414a,b,c can be made via a network 415, such as a local area network (LAN) and or a general wide area network (WAN). Such network connections can be through a network adapter 408. A network adapter 408 can be implemented in both wired and wireless environments. Such networking environments are conventional and commonplace in dwellings, offices, enterprise-wide computer networks, intranets, and the Internet.

For purposes of illustration, application programs and other executable program components such as the operating system 405 are illustrated herein as discrete blocks, although it is recognized that such programs and components reside at various times in different storage components of the computing device 401, and are executed by the data processor(s) of the computer. An implementation of media manipulation software 406 can be stored on or transmitted across some form of computer readable media. Any of the disclosed methods can be executed by computer readable instructions embodied on computer readable media. Computer readable media can be any available media that can be accessed by a computer. By way of example and not meant to be limiting, computer readable media can comprise "computer storage media" and "communications media." "Computer storage media" comprises volatile and non-volatile, removable and non-removable media implemented in any methods or technology for storage of information such as computer readable instructions, data structures, program modules, or other data. Exemplary computer storage media comprises, but is not limited to RAM, ROM, EEPROM, flash memory or memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence (AI) techniques such as machine learning and iterative learning. Examples of such techniques include, but are not limited to, expert systems, case-based reasoning, Bayesian networks, behavior-based AI, neural networks, fuzzy systems, evolutionary computation (e.g. genetic algorithms), swarm intelligence (e.g. ant algorithms), and hybrid intelligent system (e.g. expert interference rules generated through a neural network or production rules from statistical learning).

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, mobile phones, softphones, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method of fraud mitigation of a user device or account comprising:
    accessing configurable data to define a plurality of fraud indicators;
    dynamically monitoring the user device or account to identify fraudulent calling activity based on one or more of the plurality of defined fraud indicators;
    determining a fraudulent calling activity on an affected user device or account;
    applying a fraud mitigation action including dynamically re-issuing new network access credentials to the affected user device or account during an in-process calling activity; and
    delivering the new network access credentials over a secure connection.

2. The method of fraud mitigation according to claim 1, wherein the configurable data includes thresholds that are based on at least one of an accumulated number of calls, a call type, a calling location, a call duration, a call frequency, a time of day a call is being placed, or a financial cost for a call.

3. The method of fraud mitigation according to claim 2, wherein the call type is at least one of a long-distance call, an international call, or a toll call.

4. The method of fraud mitigation according to claim 1, wherein the identified fraudulent calling activity is recorded in historical data and used to further define fraud indicators.

5. The method of fraud mitigation according to claim 4, wherein the historical data further comprises previously called phone numbers, identified targeted calling locations, destination area code, destination country, and fraudulent calling patterns.

6. The method of fraud mitigation according to claim 5, wherein the fraudulent calling patterns are based on one or more of a number of calls placed during a specific time period, a type of calls placed during a specific time period, a number of calls placed from a specific user device or account, a number of calls placed from a specific group of user devices or accounts, or destination of outbound calls.

7. The method of fraud mitigation according to claim 5, wherein the identified targeted calling location is represented by one of a specific phone number, a calling area code or a country code.

8. The method of fraud mitigation according to claim 1, wherein an in-process fraudulent call is also terminated by transmitting a call termination instruction to at least one of an Edge Server, telephony Private Branch Exchange (PBX) or to the affected user device or account.

9. The method of fraud mitigation according to claim 1, wherein a call termination or a call blocking instruction can be issued responsive to a determined fraudulent calling activity by art application programing interface (API) instruction to at least one of an Edge Server, telephony Private Branch Exchange (PBX) or to the affected user device or account.

10. The method of fraud mitigation according to claim 1, wherein the new network access credentials comprises at least one of a new username, password or new network configuration instructions for providing an alternative connection point, including a new IP address or DNS location.

11. A fraud mitigation system for a user device or account comprising:
at least one storage system comprising configurable data for defining a plurality of fraud indicators;
a fraud monitoring system operatively connected to the at least one storage system and dynamically monitoring a user account or device to identify fraudulent calling activity based on the defined fraud indicators; and
at least one fraud mitigation component operatively connected to the fraud monitoring system wherein the fraud mitigation component responsive to an identified fraudulent calling activity instructs a phone credential change system to dynamically issue new network access credentials to the affected user device or account during an in-process calling activity, and delivers the new network access credentials over a secure connection.

12. The fraud mitigation system according to claim 11, wherein the fraud indicators defined by the configurable data further comprises thresholds that are based on at least one of an accumulated number of calls, a call type, a calling location, a call duration, a call frequency, a time of day a call is being placed, or a financial cost for a call.

13. The fraud mitigation system according to claim 12, wherein the call type is at least one of a long-distance call, an international call, or a toll call.

14. The fraud mitigation system according to claim 11, wherein the identified fraudulent calling activity is recorded in historical data and accessed by the fraud monitoring system to further define fraud indicators.

15. fraud mitigation system of claim 14, wherein the historical data further comprises previously called phone numbers, calling locations, destination area code, destination country, and fraudulent calling patterns.

16. The fraud mitigation system according to claim 15, wherein the fraudulent calling patterns are based on one or more of a number of calls placed during a specific time period, a type of call placed during a specific time period, a number of calls placed from a specific user device or account, a number of calls placed from a specific group of user devices or accounts, or destination of outbound calls.

17. The fraud mitigation system according to claim 15, wherein the calling location is represented by one of a specific phone number, a calling area code or a country code.

18. The fraud mitigation system according to claim 11, wherein an in-process fraudulent call is terminated by transmitting call termination instructions to at least one of an Edge Server, telephony Private Branch Exchange (PBX), or to the affected user device or account.

19. The fraud mitigation system according to claim 11, wherein a Provisioning Server issues new network access credentials to the affected user device or account.

20. The fraud mitigation system according to claim 19, wherein the new network access credentials to the affected user device or account comprise at least one of a new username, password or new network configuration instructions for providing an alternative connection point, including a new IP address or DNS location.

21. The fraud mitigation system according to claim 11, wherein a call termination or a call blocking instruction is issued responsive to an identified fraudulent calling activity using an application programing interface (API) to a telephony system's Private Branch Exchange (PBX).

22. A telephony fraud mitigation system comprising:
at least one storage system having configurable data for defining a plurality of fraud indicators;
a fraud monitoring system executing on a computing device for using the plurality of fraud indicators to dynamically monitor a subscriber account to identify fraudulent calling activity; and wherein, and upon a determination that fraudulent calling activity is occurring or has recently occurred on a subscriber account, employing a fraud mitigation component comprising a phone credential change system to dynamically re-issue new network access credentials to the affected subscriber account during an in-process calling activity, and delivers to the new network access credentials over a secure connection.

\* \* \* \* \*